Nov. 17, 1970     D. R. DAVIS     3,540,811
FLUID-COOLED TURBINE BLADE
Filed June 26, 1967     2 Sheets-Sheet 1
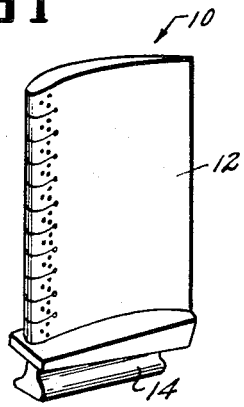
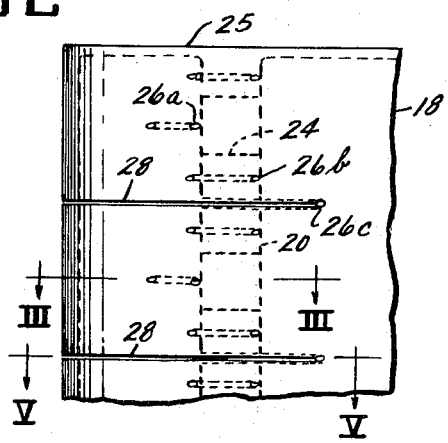
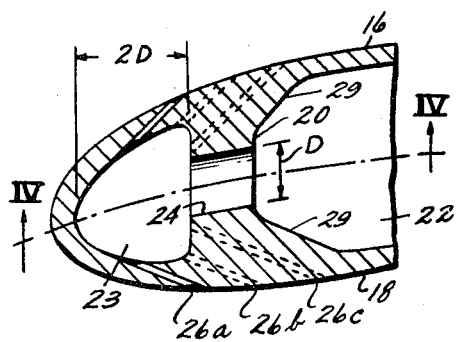
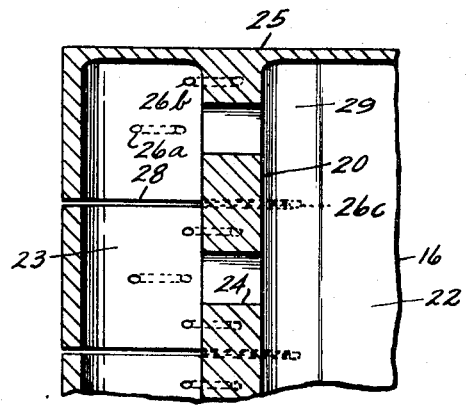
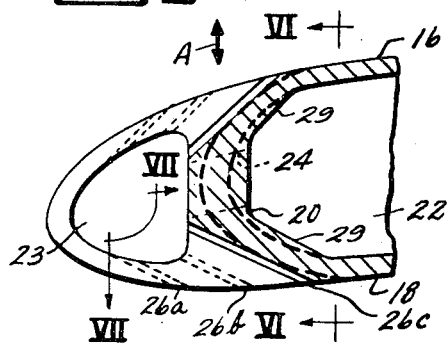
Inventor
DAVID R. DAVIS
ATTORNEY

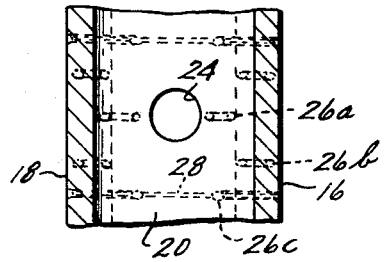
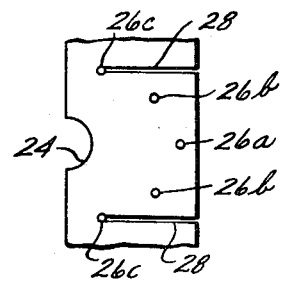
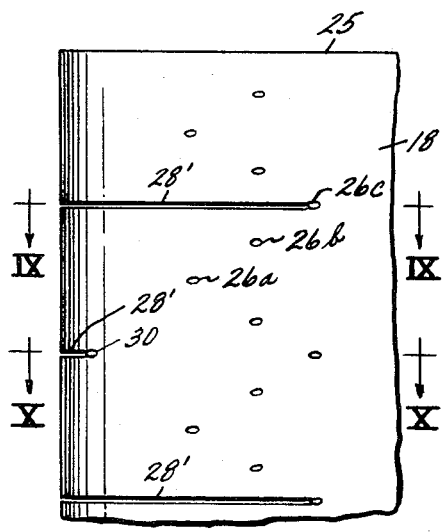
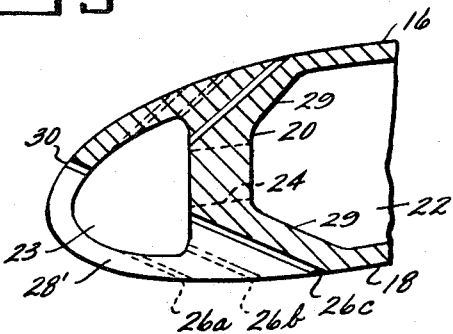
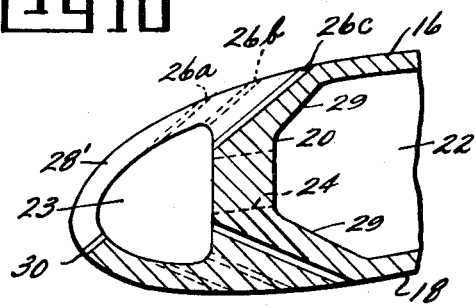

United States Patent Office 3,540,811
Patented Nov. 17, 1970

3,540,811
FLUID-COOLED TURBINE BLADE
David R. Davis, Cincinnati, Ohio, assignor to General Electric Company, a corporation of New York
Filed June 26, 1967, Ser. No. 649,790
Int. Cl. F01d 5/08
U.S. Cl. 416—90      8 Claims

ABSTRACT OF THE DISCLOSURE

An integral, shell-like turbine bucket has an internal rib extending between opposite walls of the shell adjacent the leading edge of the blade and divides the blade into a nose chamber and a cooling air chamber. Cooling air passes through holes in the rib into the nose chamber and provides impingement cooling of the extreme leading edge of the blade. Air then passes from the nose chamber through small holes angled in a downstream direction to provide convection and film cooling of the leading edge portion. Slots are cut in the leading edge portion of the blade in advance of the rib so that the rib serves as a structural member unaffected by differential thermal expansion between it and the nose portion. The slots terminate in certain of the smaller holes which also serve to reduce stress concentration. The smaller holes are arranged to maintain a minimum thermal gradient in the stress-bearing structural rib. An alternate embodiment of the invention illustrates a different manner in forming the very narrow stress-relieving slots.

---

The invention described and claimed in the United States patent application herein resulted from work done under United States Government contract FA–SS–66–6. The United States Government has an irrevocable, non-exclusive license under said application to practice and have practiced the invention claimed herein, including the unlimited right to sublicense others to practice and have practiced the claimed invention for any purpose whatsoever.

The present invention relates to improvements in turbine blades or buckets and more particularly to such blades that operate in extreme temperature environments requiring internal cooling mechanisms.

It has long been recognized that blades of turbines operating in a high temperature gas stream require internal cooling and many proposals have been made for obtaining such cooling. In gas turbine engines it has become common practice to divert air from the compressor and pass it through the turbine rotor to the interior of the blades, with various forms of passageways being utilized to cool the blade by convection, impingement, and boundary layer films.

While some of these approaches have been quite effective, none have provided the desired effectiveness in cooling the leading edge portion of the blade when operating at extreme temperatures. The leading edge portion of the blade must sustain the highest temperature levels and resist the substantial stresses resulting from the gas bending load on the airfoil. One of the problems encountered in cooled airfoils is that holes and passageways for coolant air substantially weaken the nose portion.

The object of the invention is, therefore, to provide a structurally stronger turbine blade having cooling mechanism for operating in extreme temperature environments.

In a broader sense the object of the invention is to provide an elongated airfoil member which, when disposed in a hot gas stream, has superior strength characteristics and the capability of maintaining its airfoil integrity, particularly at the leading edge portion thereof.

The invention is characterized by an elongated airfoil member formed by a thin wall shell, the opposite sides of which merge to form a nose portion at its leading edge. An integral rib extends between the walls of the shell adjacent the leading edge, at least substantially the length of the airfoil member and forms an interior airfoil chamber and a second chamber on the opposite side which is pressurized with cooling fluid. The cooling fluid is directed through holes in the rib to provide an impingement cooling mechanism for the extreme leading edge of the blade. A plurality of relatively small holes extend through the walls of the nose portion and are angled in the direction of hot gas flow so that the cooling fluid may pass from the nose chamber to the exterior of the blade, thereby providing convection and film cooling mechanisms for the nose portion.

The nose portion is provided with slots along its length extending back to its rib. The slots are extremely narrow and function to minimize, if not eliminate, thermal stresses in the rib as a result of differential thermal expansion between the rib and the extreme leading edge of the blade. Little or no flow of cooling fluid is provided through the slots. The nose portion of the blade thus functions solely as an airfoil member while the rib functions as the structural member of the blade. Selected cooling holes also function to prevent stress risers at the ends of the slots which enter therein.

The cooling holes are further arranged upstream of the rib and disposed to maintain a minimum thermal gradient along the length of the rib being spaced from the rib holes a substantially equal mass distance.

The above and other related objects and features of the invention will be apparent from a reading of the following description of the disclosure found in the accompanying drawings and the novelty thereof pointed out in the appended claims.

In the drawings:

FIG. 1 illustrates a turbine bucket or blade embodying the present invention;

FIG. 2 is a fragmentary side view, on an enlarged scale, of a portion of the blade seen in FIG. 1;

FIG. 3 is a section taken on line III—III in FIG. 2;

FIG. 4 is a section taken on line IV—IV in FIG. 3;

FIG. 5 is a section taken on line V—V in FIG. 2;

FIG. 6 is a section taken on line VI—VI in FIG. 5;

FIG. 7 is a development taken generally on line VII—VII in FIG. 5;

FIG. 8 is a fragmentary view, similar to FIG. 2, of an alternate embodiment of the invention;

FIG. 9 is a section taken on line IX—IX in FIG. 8; and

FIG. 10 is a section taken on line X— in FIG. 8.

FIG. 1 illustrates a turbine blade 10 which may be conventionally fabricated with an airfoil section 12 at one end and a tang 14 at its inner end for attachment to a rotor. It is further contemplated that the blade 10 will be formed as a hollow shell so that cooling air can be supplied to the interior thereof as through passageways in the tang which communicate with a cooling air source through the turbine rotor in known fashion.

As will better be seen from FIGS. 2–5, the opposite walls 16 and 18 of the airfoil shell blend to a nose portion at the leading edge of the blade. An integral rib 20 joins the side walls 16 and 18 (FIGS. 2 and 3) adjacent to and spaced rearwardly from the nose portion of the blade. The rib 20 preferably extends the full radial length of the blade and defines a cooling air chamber 22 and a nose chamber 23, both of which are closed by a cap portion 25 at the outer end of the blade. The chamber 22 is connected to the source of pressurized cooling air as indicated above.

Cooling air passes through holes 24 which are spaced along the length of the rib 20. This cooling air passes into the nose chamber 23 and impinges against the inner surface of the nose portion to provide an effective cooling action. The cooling air, after impingement on the inner surface of the nose portion, then passes through a plurality of holes 26 (further designated by subscripts) which are disposed at an angle to the outer surface of the airfoil and in a direction downstream of the flow of hot gases therepast. The air discharged from the holes 26 becomes entrained in the relatively slow moving, laminar boundary layer of hot gases flowing over the airfoil. By so introducing the cooling air into the boundary layer, effective and efficient cooling action of the blade immediately downstream of the nose portion is obtained. It is also contemplated that further air may be introduced into the boundary stream downstream of the nose portion or other cooling mechanisms could be utilized for the downstream portions of the blade toward its trailing edge.

It will also be seen that the nose portion of the blade is provided with extremely narrow slots 28 which cut through the nose portion and extend into the rearmost cooling holes 26c. These slots preferably have a width in the order of .003 inch for purposes presently explained.

The net effect of the described configuration is that the nose portion of the blade, i.e., that portion of the blade upstream of the rib 20, functions simply as an aerodynamic member, enabling it to be adequately cooled by impingement of air thereagainst and by the provision of the several holes 26 which provide convection cooling. The rib 20 provides the structural strength ordinarily provided by the leading edge of a blade. This is indicated by the broken lines of FIG. 5. It will be seen that fillets 29 blend the rib 20 with the shell walls 16, 18 so that an equivalent structural element is able to function and be loaded in essentially the same fashion as the leading edge of a conventional blade. Put another way, the slots 28 prevent the airfoil shell upstream of the rib 20 from functioning as a radial beam which would be loaded aerodynamically generally in the direction of arrow A in FIG. 5, such loading being by the rib 20. It will also be noted that the equivalent structural member, through rib 20, is maintained at a relatively cool temperature so that it may be stressed to higher levels. Further, it is protected from erosion by the nose section so that greater working life can be expected.

The slots 28 are not intended to provide cooling air for the nose portion of the blade. Instead they simply minimize thermal stresses which would result from a differential expansion between the extreme leading edge of the nose portion and the rib 20. It is for this reason that the slots are extremely narrow, in the order of .003 inch. In fact, with such a dimension, when the blade is at its operating temperature in a hot gas stream, these slots are substantially closed as a result of metal expansion. By limiting the slots 28 to this one function, greater effectiveness can be had in cooling the leading portion or edge of the nose by impingement cooling resulting from the air passing through the holes 24. The remainder of the nose portion is convection and film cooled by air passing through the holes 24. These combined cooling mechanisms are much more effective and reliable than any attempt to utilize the slots 28 in the cooling function. In connection with the impingement cooling mechanism, it has been found preferable that the forward face of the rib 20 be spaced from the inner surface of the extreme leading edge a distance twice the effective diameter of the holes 24, as indicated in FIG. 3. It will also be noted that the holes 26c provide the dual function of minimizing if not eliminating, stress concentrations at the ends of the slots 28 as well as providing convection and film cooling.

The arrangement of the holes 26 is also of significance in minimizing thermal gradients in the stress-bearing structural rib 20, and consequently minimizing thermal stresses therein which would reduce its effective strength. In a lengthwise sense the coolest portion of the rib 20 will be adjacent the holes 24 where cooling air passes through to provide impingement cooling of the extreme leading edge of the nose portion. It will be seen that the holes 26c, through which cooling air also passes, are spaced approximately midway between the holes 24. The intermediate holes 26b are spaced upstream thereof and the single holes 26a are spaced further upstream and substantially in the same plane as the holes 24. Viewed in the development of FIG. 7, it will be seen that the several holes 26 are spaced upstream and generally concentrically of the holes 24 to provide the proper distribution of material therebetween for maintaining a minimum temperature gradient in the rib 20. This spacing provides an approximately equal mass-distance between the holes 26 and the holes 24 which they surround. This relationship of the holes 26 also minimizes the local temperature gradient along the length of the blade in the direction of hot gas flow.

The structural integrity of the blade, as a whole, is enhanced as the slotted nose portion is subject to deterioration only as a function of heat and the erosive effects of the gas stream, while the rib takes structural loadings on the leading portion of the blade.

FIGS. 8-10 illustrate a modified embodiment of the invention incorporating a form of slots 28' which can give economies in manufacture. The slots 28' may be formed with a cutting wire which is drawn into the blade parallel to the axes of holes 26c on alternate sides of the blade. Thus, alternate holes 26c (along the length of the blade) function as a stress reliever at one end of the slots and holes 32 function as a stress reliever at the opposite end of the slots, as will be apparent from FIGS. 9 and 10. While the air passing from the holes 30 is not as effective in cooling the outer space of the blade, nonetheless the overall combination is highly advantageous.

Other modifications of the described embodiments of the invention will occur to those skilled in the art within the scope of the present inventive concepts which is to be derived solely from the following claims.

Having thus described the invention, what is claimed as novel and desired to be secured by Letters Patent of the United States is:

1. An elongated airfoil member to be disposed in a hot gas stream with its leading and trailing edges generally oriented in the direction of hot gas flow,
    said member comprising a thin-walled shell, the opposite sides of which merge to form a nose portion at said leading edge and an integral rib extending between the walls of said shell adjacent said leading edge, said rib extending at least substantially the length of said airfoil member and defining an interior nose portion chamber on one side of the rib and a second chamber on the opposite side thereof which may be pressurized with cooling fluid,
    said rib having holes therethrough, spaced along its length and directed towards said leading edge,
    a plurality of relatively small holes extending through the walls of said nose portion and angled in the direction of hot gas flow, said holes being disposed in a pattern upstream of and at an approximately equal mass-distance concentric of said rib holes to thereby minimize thermal gradients in said rib.

2. An elongated airfoil member to be disposed in a hot gas stream with its leading and trailing edges generally oriented in the direction of hot gas flow,
    said member comprising a thin-walled shell, the opposite sides of which merge to form a nose portion at said leading edge and an internal rib extending between the walls of said shell adjacent said leading edge, said rib extending at least substantially the length of said airfoil member and defining an interior nose portion chamber on one side of the rib and a second chamber on the opposite side thereof which may be pressurized with cooling fluid, said rib having holes therethrough spaced along its length and directed towards its leading edge for impingement cooling thereof, said nose portion having a plurality of relatively small holes extending therethrough its walls from the nose chamber to provide convection cooling therefor, said nose portion further having a plurality of narrow slots spaced along its length and isolating said rib from stresses resulting from relative thermal expansion between said rib and said nose portion.

3. An elongated airfoil member as in claim 2 wherein, said slots have a width of approximately .003 inch, and terminating in selected of said relatively small holes to prevent stress risers in the walls of said nose portion.

4. An elongated airfoil member as in claim 2, formed as the cambered, reaction portion of a turbine blade, and further wherein, said relatively small holes are angled in the direction of hot gas flow and disposed in a pattern upstream of and at an approximately equal mass-distance concentrically of said rib holes to thereby minimize thermal gradients in said rib.

5. An elongated airfoil member as in claim 4 wherein, the slots have a width of approxiamtely .003 inch and terminate in selected downstream angled holes and the rib has integral fillets blending with the shell walls of the second chamber to provide an effective structural member which is curved in the same fashion as the leading edge of the blade.

6. An elongated airfoil member as in claim 5 wherein, the internal rib is spaced from the interior of the extreme leading edge of the airfoil member a distance approximating the mean diameter of the rib holes.

7. An elongated airfoil member as in claim 5 wherein, the slots are disposed midway between said rib holes and enter into the angled holes furthest downstream.

8. An elongated airfoil member as in claim 5 wherein, the slots terminate alternately, along the length of the blade, in the downstream most holes on opposite sides of the blade and holes are provided in alignment with the angles holes in which the slots terminate.

References Cited
UNITED STATES PATENTS

| | | | |
|---|---|---|---|
| 2,489,683 | 11/1949 | Stalker | 253—39.15 |
| 2,858,100 | 10/1958 | Stalker | 253—39.15 |
| 2,863,633 | 12/1958 | Stalker | 253—39.15 |
| 2,933,238 | 4/1960 | Stalker | 253—39.15 |
| 3,246,469 | 4/1966 | Moore | 253—39.15 |

SAMUEL FEINBERG, Primary Examiner

U.S. Cl. X.R.

416—97, 231, 233